M. S. ROSENFELD.
METHOD OF AND APPARATUS FOR WINDING TAKE-UP REELS.
APPLICATION FILED FEB. 15, 1917.
1,331,578.
Patented Feb. 24, 1920.
2 SHEETS—SHEET 1.
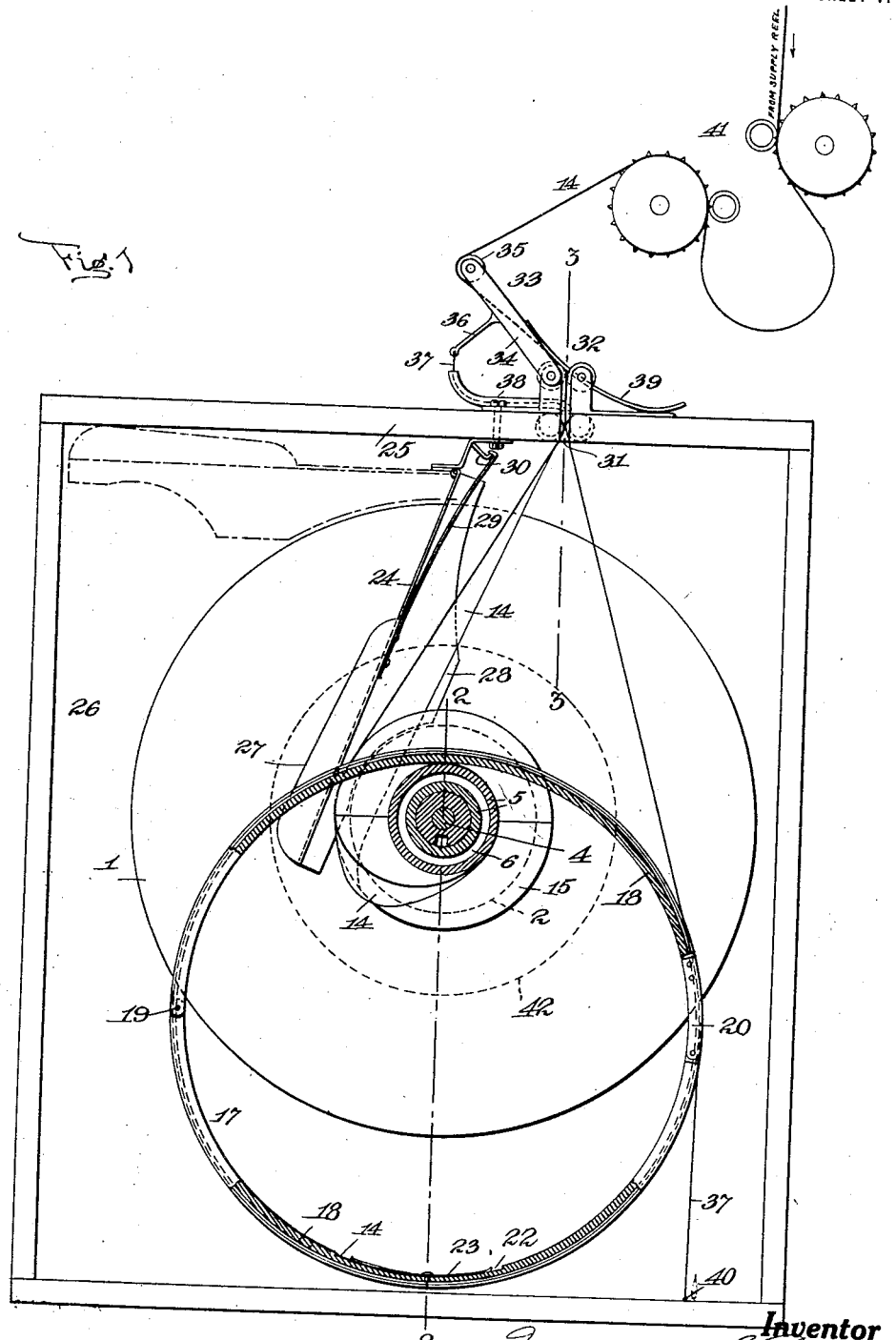

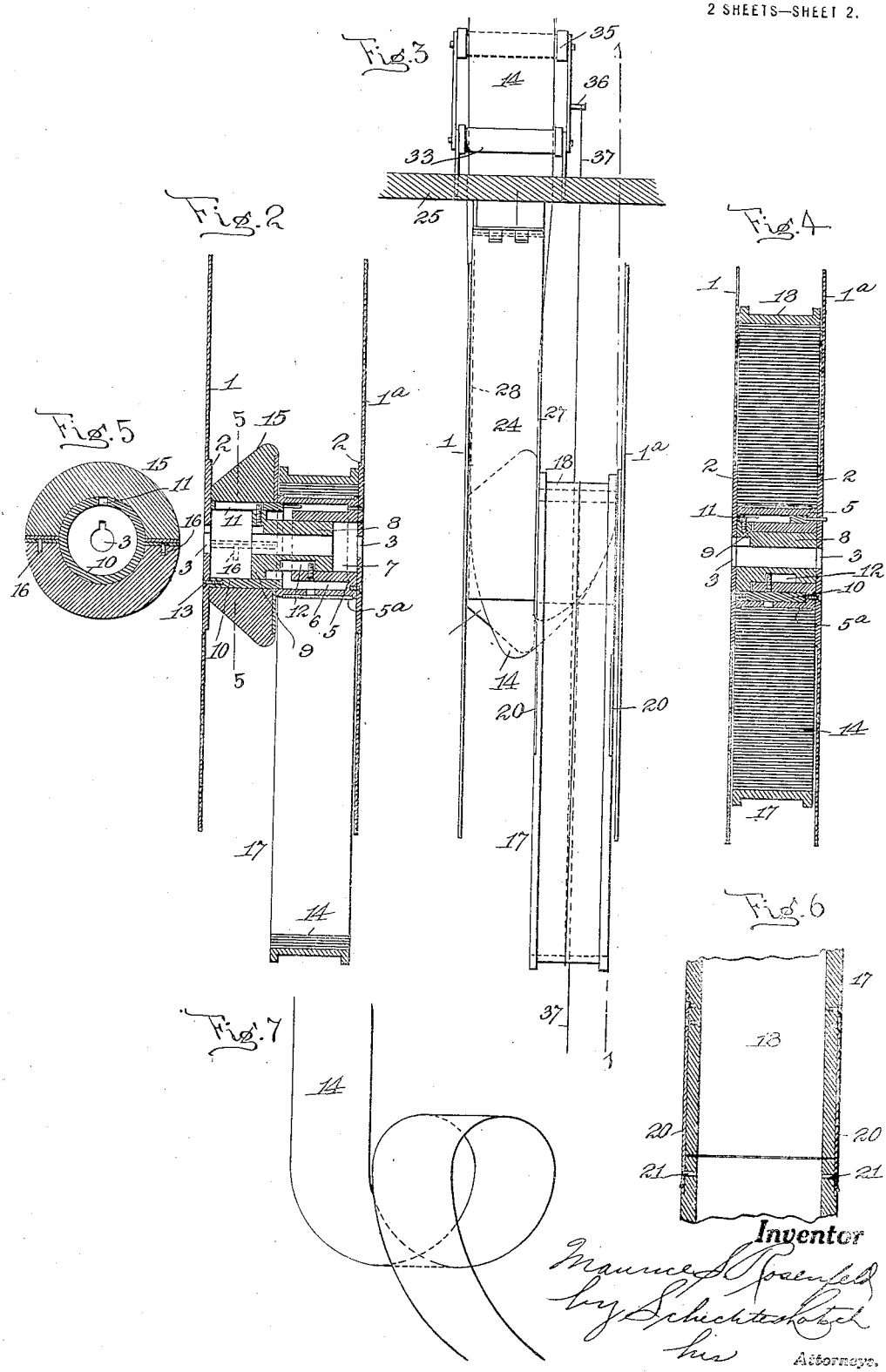

UNITED STATES PATENT OFFICE.

MAURICE S. ROSENFELD, OF NEW YORK, N. Y., ASSIGNOR, BY MESNE ASSIGNMENTS, TO DECALMO MACHINE CO., INC., A CORPORATION OF DELAWARE.

METHOD OF AND APPARATUS FOR WINDING TAKE-UP REELS.

1,331,578.   Specification of Letters Patent.   Patented Feb. 24, 1920.

Application filed February 15, 1917. Serial No. 148,321.

*To all whom it may concern:*

Be it known that I, MAURICE S. ROSENFELD, a citizen of the United States, residing in the borough of the Bronx, county of Bronx, city and State of New York, have invented a certain new and useful Apparatus for Winding Take-Up Reels, of which the following is a specification.

My invention relates to take-up reels of moving picture projecting machines, and has for its objects to avoid the necessity of rewinding the film from the take-up reel on to the supply reel from which it is to be fed across the projecting apparatus.

A further object is to utilize the take-up reel as a supply reel without first removing the film which has been wound thereon.

These and further objects will more fully appear in the following specification and accompanying drawings considered together or separately.

I have illustrated one embodiment of my invention in the accompanying drawings, in which like parts are designated by similar reference characters in all of the figures, and in which,—

Figure 1 is a longitudinal sectional view of a portion of a projecting machine embodying my invention, the section being taken on the line 1—1 of Fig. 3;

Fig. 2 is a detail sectional view taken on the line 2—2 of Fig. 1, with the parts in position for winding;

Fig. 3 is a detail side elevation partly in section, the section being taken on the line 3—3 of Fig. 1;

Fig. 4 is a view similar to Fig. 2, but with the film wound, and the reel in condition to be employed as a supply reel;

Fig. 5 is a section on the line 5—5 of Fig. 2;

Fig. 6 is a detail sectional view of the carrier ring lock; and

Fig. 7 is a diagrammatic view showing the manner in which the film is wound upon the take-up reel.

In moving picture projecting machines, as at present employed, a film carrying the pictures is wound upon a supply reel which is placed in position above the projection, and the film is led down between the source of illumination and the lens. After passing the lens, the film is wound upon a take-up reel situated below the rest of the apparatus. The loose or outer end of the film on the supply reel is the first to pass the projector and the first to be applied to the take-up reel. In order to fill the take-up reel, the end of the film is secured to the spool of the reel, and when wound, that portion of the film which is to be first passed through the machine when used again, is on the inside of the take-up reel. The film must be rewound upon another reel before it is in condition to be again exhibited.

By my invention, the film is wound upon the take-up reel from the outside inward, and when the winding is completed, the take-up reel may be used as the supply reel without the necessity of rewinding the film.

In carrying out my invention, I provide a reel composed of two side plates, 1, 1ᵃ. The center of each plate has a boss 2, and each is provided with a perforation 3, by means of which the reel as a whole may be mounted on the spindle 4 of the take-up magazine. Secured to the side plate 1ᵃ is a sleeve 5 which is provided with a longitudinal recess 6. Carried within the bore 7 of the sleeve 5 is a hub 8 which also engages the spindle 4. The hub 8 has an enlarged head 9 of the same diameter as the inner wall of the recess 6, and engaging the head is a nipple 10 which is adapted to enter the recess 6 and is slidable on the head 9. The nipple is provided with a slot 11 which is engaged by a pin on the head to limit the movement of the nipple. The hub 8 has a longitudinal slot 12 which is engaged by a pin carried by the sleeve 5 to limit the longitudinal movement of the hub relatively thereto. The side plate 1 is secured to the outer end of the nipple 10 by means of screws 13.

From the above description, it will be seen that the take-up reel comprises two side plates and a collapsible hub, the outer member of the hub being secured to plate 1ᵃ and the inner member of the hub being secured to plate 1. This reel, as will presently be shown, is adapted to serve as a supply reel when the reel is in closed position, that is to say, when the inner member of the hub is completely received within the outer member. Before the reel can receive the film to be wound thereon with the last part of the film innermost, that is to say, next to the hub, the side plates are moved apart so that the reel will be in open position, which is the position shown in Fig. 2.

When it is desired to employ the device above described as a take-up reel, the side plates 1 and 1ᵃ are separated to the limit permitted by the slots 11 and 12. The width of the reel will now be considerably greater than that of a film 14 such as is ordinarily employed. On that portion of the nipple 10 which projects from the sleeve 5 is placed a cone 15. This cone has a bore which makes a relatively tight fit with the outside of the nipple. The cone is divided longitudinally so that it may be placed in position on the nipple, and the halves of the cone are held in position by means of pins 16. The smaller end of the cone which abuts against the boss 2 of the plate 1, has a diameter somewhat greater than that of the sleeve 5, and its conical face is approximately of a length equal to the width of the film.

In connection with the reel above described, I employ a gathering ring 17. The gathering ring is composed of two semi-circular members 18, 18, hinged together at 19. The free end of one member is provided at each side thereof with a flat spring 20. The springs lie in recesses in the sides of the member and their ends project into recesses in the free end of the other member which carries pins 21 which engage perforations in the ends of the springs, and hold the members together to form a member having an internal diameter equal to the exterior of a completed roll of film. The inner surface of one of the ring members is recessed as at 22, and a flat spring 23 is secured therein by means of a screw or otherwise. The outer surface of the ring is provided with end flanges to form a circumferential recess on the ring. The gathering ring is opened by separating the springs 20 from the pins 21, and is placed in position suspended by the engagement of its inner surface with the sleeve 5 with the ends of the members locked together by the reëngagement of the springs and pins. When the ring 17 is in position suspended on the sleeve 5 forming the hub of the reel, and the reel is rotated, the frictional engagement of the ring and sleeve will cause the ring to rotate at the same surface speed as the hub. To increase the frictional engagement of the ring and hub, the surface of the latter may be covered with an envelop 5ᵃ of leather, rubber, cloth or any other suitable material.

In connection with the take-up reel, I employ a film guard which comprises a plate 24 hinged to the inside of the top 25 of the take-up magazine 26. The plate 24 is of a width sufficient to bridge the space between the side of the gathering ring and the side plate 1 and extends to a point below the center of the reel. That side of the plate 24 nearest the ring 17 has a guard flange 27, and the opposite side of the plate has a guard flange 28 which has a cut out portion to engage the boss 2 on the side plate 1. The film guard is secured in proper relation to the reel by means of a spring 29 carried by the plate 24, and having a hooked end for engagement with a keeper 30.

The top of the magazine is provided with the usual opening 31 for the admission of the film, and with the ordinary valve 32 to prevent fire from reaching the interior of the magazine. Pivoted to the side members of the valve is a tension device 33 which consists of a pair of arms 34 which engage the ends of the spindle of one of the valve rollers. Carried in the free ends of the arms 34 is a roller 35. A finger 36 projects from one of the arms 34, and to it is attached a cord 37 which extends through a guide 38, through the film opening 31, around the periphery of the gathering ring 18, and is anchored to the bottom of the magazine 26. A spring 39 carried by one of the arms 34 engages the top of the magazine and tends to press the tension device in the direction to shorten the distance between the arm 36 and the anchor 40 of the cord 37, and thereby release the tension on the gathering ring.

With the device in the position above described, the operation is as follows:

The film from the supply reel (not shown) is threaded through the projecting apparatus, a part of which is shown diagrammatically at 41. The end of the film is passed under the roller 35 and down through the valve 32 and the opening 31. The guard 24 is raised to the dotted line position shown in Fig. 1. The film is then led to the conical surface 15, which is directly below the opening. When the film engages the conical surface, it is caused to take a partial twist which will throw the end of the film out of the plane it has when leaving the valve, and as it passes over the larger rounded end of the cone it will be to one side of the cone and over the sleeve 5. The ring 17 is now raised from contact with the sleeve and the end of the film is passed around the sleeve from the underside, and is inserted under one end of the spring 23 in the recess 22. The film is now secured to the ring which is then allowed to rest on the sleeve with the film between the ring and sleeve. The guard is now lowered to the position shown in full lines in Fig. 1. The plate 24 will prevent the film from jumping off the conical surface, the flange 27 will prevent the edge of the film from getting between the cone and ring 17, and the flange 28 will ward off the other edge of the film from the side plate 1.

On power being applied to the pulley 42 on the spindle 4, the reel will be rotated and the frictional engagement of the film with the surface of the sleeve 5 will cause the gathering ring 17 to rotate, and the film will be wound on the inside of the gathering ring.

As the surface speed of the cone 15 is faster than the travel of the film through the projecting apparatus 41, tension will be placed on the film below the lower feeding sprocket of the projector. As this tension increases, the amount of film between the sprocket and the valve 32 will naturally be shortened. This will move the arm 34 toward the vertical position, and such movement will pull on the cord 37 and tighten it around the gathering ring 17, and retard the movement of the ring and the cone. As the movement of the cone is retarded, the feed of the film by the sprockets will be uniform, and as the amount of film between the sprockets and the valve increases, the spring 39 will move the arm 34 to the left, the cord will be loosened around the gathering ring, and the ring and cone will resume their normal speeds until the tension is again sufficient to raise the arm 34.

When the last of the film has passed around the cone, the entire film is within the ring 17 with the first picture of the series on the outside, and the last picture on the sleeve 5. The guard is now swung to the position shown in dotted lines in Fig. 1, and the reel carrying the cone, film and gathering ring is removed, with the spindle 4 and part 5, from the magazine through the door in the side thereof. The halves of the cone are separated from each other and removed from the nipple 11. The side plate 1 is moved over until it engages the end of the sleeve 5. The springs 20 are released from engagement with the pins 21 and the ring 17 is opened and removed from the reel.

The reel may now be placed in position on the top of the projecting apparatus, and as the beginning of the picture series is on the outside of the roll, the film may be drawn off as before.

In accordance with the provisions of the patent statute, I have described the principle of my invention together with the apparatus which I now consider to represent the best embodiment thereof, but I desire it understood that my invention is not confined to the particular form of apparatus herein shown and described, and, therefore, I claim broadly the right to employ all equivalent instrumentalities coming within the scope of the claims, and by means of which objects of my invention are attained, and the new results accomplished, as herein set forth, as it is obvious that the particular embodiment herein shown and described is only one of many that can be employed to attain these objects and accomplish these results.

Having now described my invention, what I claim as new and desire to secure by Letters Patent is:

1. An apparatus for winding take-up reels having, in combination, a reel having a collapsible hub, a cone adapted to be mounted on one section of the hub when the reel is in open position, a ring adapted to be mounted on the other section of the hub when the reel is in open position and means for feeding a film to the reel, said cone serving to direct the film into the ring.

2. An apparatus for winding take-up reels having, in combination, a reel having a collapsible hub, a split cone adapted to fit over one section of the hub and a split ring adapted to be suspended from the other section of the hub when the reel is in open position, means on the inner periphery of the ring for engaging a film and means for feeding the film to the cone, the cone serving to direct the film into the ring.

3. An apparatus for winding take-up reels having, in combination, a reel having a collapsible hub, a ring adapted to be suspended from one section of the hub when the reel is in open position and a cone adapted to fit over the other section with its larger end toward the ring, and a film-feeding means in alinement with the cone for feeding a film to the reel, the cone serving to direct the film into the plane of the ring.

4. An apparatus for winding take-up reels having, in combination, a reel having a collapsible hub, a ring adapted to be suspended from the hub when the reel is in open position, means adapted to be mounted on the hub to direct a film into the ring, said means and ring being constructed to be removed from the reel when the film is wound within the ring, so that the reel may be closed and used as a supply reel.

5. An apparatus for winding take-up reels having, in combination, a reel comprising two side plates and a collapsible hub, the outer member of the hub being attached to one plate and the inner member of the hub being attached to the other plate, a split ring adapted to be carried by one section of the hub, a split cone adapted to be carried by the other section of the hub, and means for feeding a film to the reel, the cone serving to direct the film into the ring.

6. An apparatus for winding take-up reels having, in combination, a reel comprising two side plates and a hub, the hub being composed of two parts, so that the plates are movable toward and from each other into closed and open position, a ring adapted to be suspended from the hub, and means for directing a film into the ring, the ring and film-directing means being removable from the reel to permit the side plates to be moved to closed position when the film is wound up on the reel.

7. An apparatus for winding take-up reels having, in combination, a reel comprising side plates and a hub, means carried by the reel constructed and arranged so that when a film is wound on the reel the part last wound will be next to the hub, said means being removable from the reel when the film is wound thereon, and means for feeding the film to the reel.

8. An apparatus for winding take-up reels having, in combination, a reel, a removable ring carried by the reel, means for directing a film into the ring, means for rotating the reel, means for feeding the film to the reel, and means for controlling the feed of the film to the reel.

9. An apparatus for winding take-up reels having, in combination, a reel, a split ring adapted to be suspended from the hub of the reel, means on the ring for engaging a film and means for directing a film into the ring, said ring becoming concentric with the hub of the reel when the film is completely wound within the ring.

10. A device of the character described, having a reel comprising a hub and side plates, a cone carried by the hub, a gathering ring carried by the hub at one side of the cone, means for directing a film to the surface of the cone, whereby its direction of movement will be changed, and means for attaching the end of the film to the ring.

11. A device of the character described, having a reel comprising a hub and side plates, a cone carried by the hub, a gathering ring carried by the hub at one side of the cone, means for directing a film to the surface of the cone, whereby its direction of movement will be changed, and means controlling the film between the hub and ring.

12. A device of the character described, having a reel comprising a hub and side plates, a cone carried by the hub, a gathering ring carried by the hub at one side of the cone, means for directing a film to the surface of the cone, whereby its direction of movement will be changed, means for attaching the film to the gathering ring, and means for imparting tension to the film.

13. A device of the character described, having a reel comprising a hub and side plates, a cone carried by the hub, a gathering ring carried by the hub at one side of the cone, means for directing a film to the surface of the cone, whereby its direction of movement will be changed, means controlling the film between the hub and ring, and means for imparting tension to the film.

14. A device of the character described, having a reel comprising a hub and side plates, a cone carried by the hub, a separable gathering ring carried by the hub at one side of the cone, means for directing a film to the surface of the cone, whereby its direction of movement will be changed, and means for attaching the end of the film to the ring.

15. A device of the character described, having a reel comprising a hub and side plates, a cone carried by the hub, a gathering ring carried by the hub at one side of the cone, means for retaining the ring in position, means for directing a film to the surface of the cone, whereby its direction of movement will be changed, and means for attaching the end of the film to the ring.

16. A device of the character described, having a reel with side plates and a collapsible hub, a cone carried on the hub when extended, means for rotating the reel, means for directing a film to the surface of the cone, whereby the lateral plane of the film will be changed so that it will engage the hub at one side of the cone, a gathering ring suspended loosely on the hub to one side of the cone, means for attaching the film to the inside of the ring, whereby the rotation of the reel will rotate the ring and wind the film on the inside thereof, and means whereby the feed of the film will impart tension to the film.

17. In a device of the character described, having a reel with a hub, a ring loosely suspended on the hub so that rotation of the reel will impart rotary movement to the ring, means on the ring for engaging a film, a spring actuated device engaging the film, a cord secured to the device, said cord passing around the ring and anchored outside the ring, whereby tension on the film will cause the cord to grip the ring.

18. A device of the character described, having a motion picture film, means for feeding the film, a reel, a ring within which the film is wound on the reel, a spring actuated device engaging the film, a cord attached to the spring actuated device, said cord encircling the ring whereby, when the speed of travel of the film, caused by the engagement of the film with the reel and ring, exceeds that of the feeding means, the tension device will be moved to tighten the cord around the ring.

This specification signed and witnessed this 14th day of February, 1917.

MAURICE S. ROSENFELD.

Witnesses:
 JOHN L. LOTSCH,
 M. JONES.